United States Patent [19]
Dean

[11] 3,934,871
[45] Jan. 27, 1976

[54] ACCUMULATOR

[75] Inventor: George A. Dean, Kansas City, Mo.

[73] Assignee: Dean Research Corporation, Kansas City, Mo.

[22] Filed: May 7, 1973

[21] Appl. No.: 357,630

Related U.S. Application Data

[63] Continuation-in-part of Ser. No. 145,684, May 21, 1971, abandoned.

[52] U.S. Cl. ................ 271/184; 214/7; 271/215
[51] Int. Cl.² ................ B65H 29/44; B65H 31/06
[58] Field of Search ........ 271/184, 80, 87, 135, 69, 271/70, 72, 214, 215, 176; 214/7

[56] References Cited
UNITED STATES PATENTS

| | | | |
|---|---|---|---|
| 3,032,340 | 5/1962 | Lawrence | 271/63 A |
| 3,178,041 | 4/1965 | Wheat | 214/7 |
| 3,541,597 | 11/1970 | Segawa et al. | 214/7 |
| 3,682,329 | 8/1972 | Dean | 214/7 |
| 3,713,650 | 1/1973 | Hodgkinson et al. | 214/7 X |

FOREIGN PATENTS OR APPLICATIONS

| | | | |
|---|---|---|---|
| 1,180,681 | 10/1964 | Germany | 214/7 |

*Primary Examiner*—Evon C. Blunk
*Assistant Examiner*—Bruce H. Stoner, Jr.
*Attorney, Agent, or Firm*—Jordan G. Bierman; Linda G. Bierman; Kenneth J. Stempler

[57] ABSTRACT

Method and apparatus for automatically conveying and stacking sheet material is provided in which the sheet material is first moved to a tiltable table assembly which tilts towards the vertical position to transfer the material from the table to a receiving means, the material being placed and detained on the receiving means in a substantially vertical position.

26 Claims, 10 Drawing Figures

INVENTOR.
GEORGE A. DEAN
BY
Bierman & Bierman
ATTORNEYS

FIG. 3
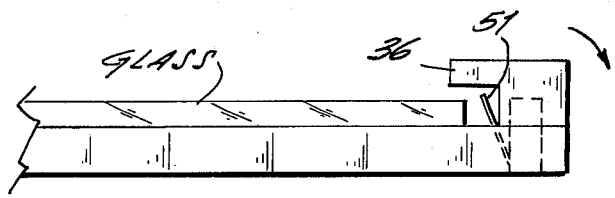
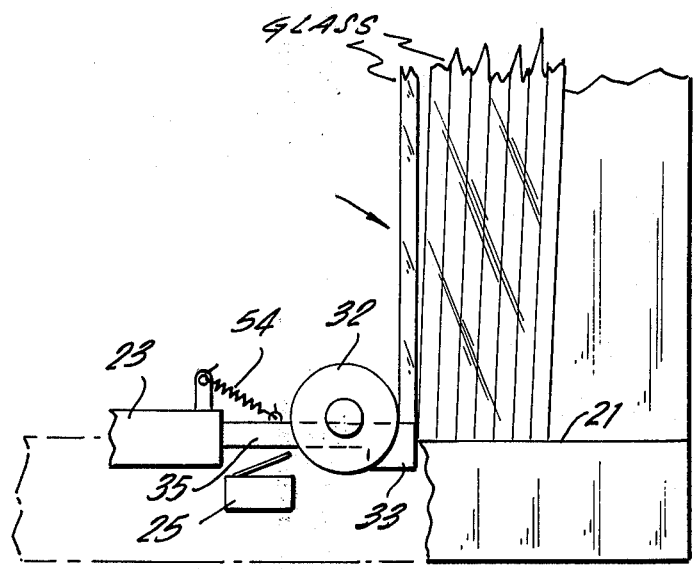
FIG. 4

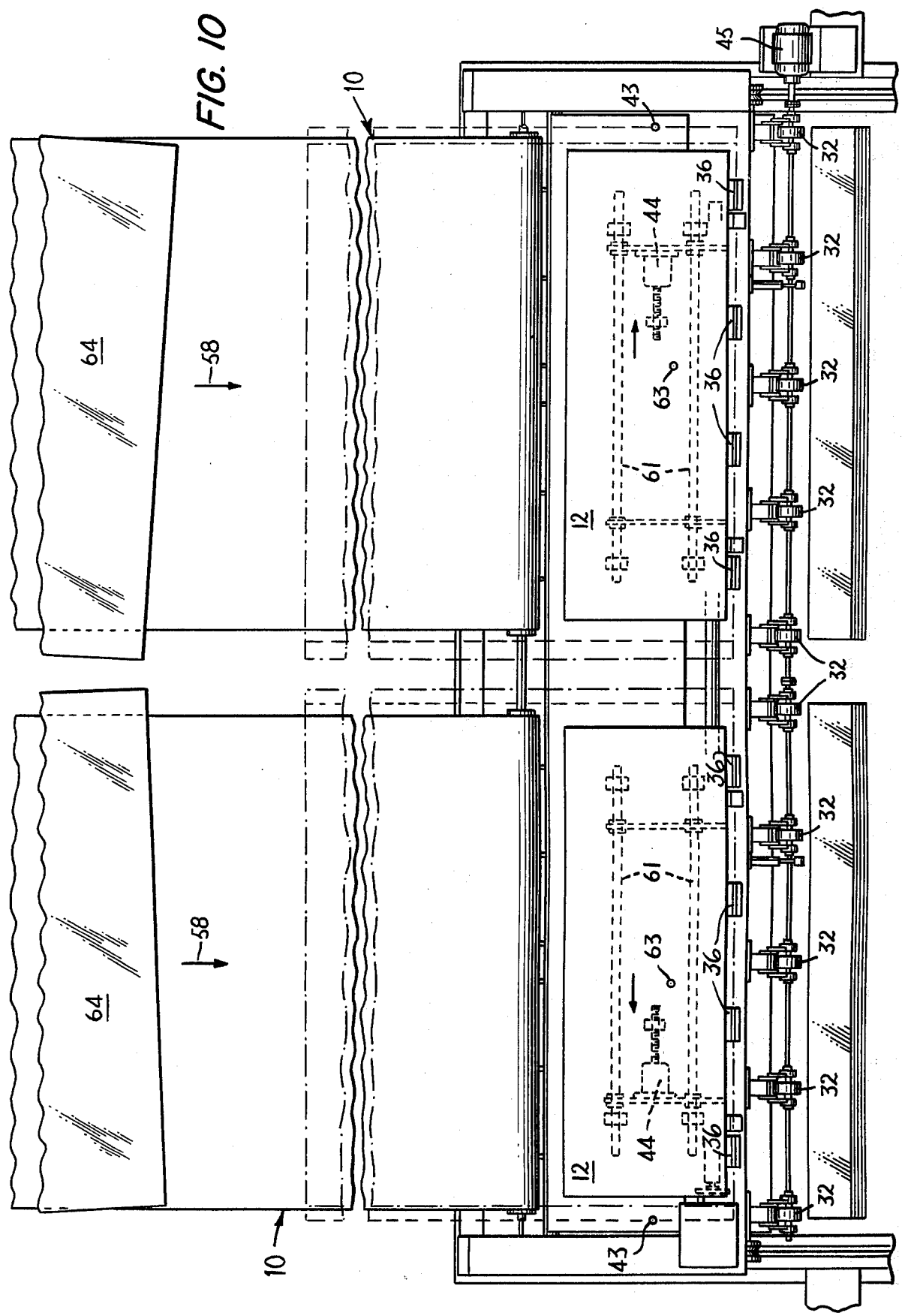

ACCUMULATOR

This application is a continuation-in-part of U.S. patent application Ser. No. 145,684, filed May 21, 1971 now abandoned.

This invention relates to means for vertically stacking sheet materials such as glass, stainless steel, steel, aluminum, etc., and more particularly, to brittle materials, such as sheet glass.

In accordance with the present invention sheets of material are horizontally conveyed from areas such as a cutting, shearing or manufacturing units by conventional means, to an automatic stacking apparatus. The stacking apparatus comprises a tiltable table assembly onto which the sheet material is moved, which table assembly is then tilted to move the sheet material towards a vertical position. Just below the table assembly and in front of it, a receiving means is provided onto which the sheet material is placed by the tilting motion of the table assembly. For best results, means are provided to limit the effect of shock on the sheet material prior to moving it onto the receiving means to permit the continuous stacking of the material in a vertical position.

Often, the material handling system described herein will be required to handle sheets of material which are longer than the tilting table assembly. Problems can arise in the handling of brittle materials, such as glass, where the sheet overhang is great. To avoid breakage in situations where sheet length is longer than the table by a factor of about two, it is preferred to utilize one or more extensible arms on the table which are movable into position to support the sheet during tilting movement of the table.

The extensible arms may be permanently extended if desired. However, to avoid generating unnecessary friction as the sheet moves over the arms, it has been found desirable to at least permit the leading edge of the sheet to clear the portion of the arms which contacts the sheet before permitting the arms to contact the sheet.

In many instances in which sheet material is conveyed between stations, the sheet may become skewed or move off center with reference to its direction of travel. Since the material handling system of the instant invention is primarily used to place sheets in a vertical stack, it is preferable to have the edges of each of the sheets in the stack in substantial alignment. This is achieved in accordance with one aspect of the present invention by providing a shifting capability for the tilting table.

In order to use the table shifting capability to advantage, one or more conventional sensors such as a photocell or pressure sensitive switch, are located along the line of sheet material movement, preferably on the line the outermost edge of the sheet would traverse if the sheet were not skewed or off center. For best results, the sensor is made operable when the sheet material reaches the forward end of the tilting table. If the sheet is positioned to cover the sensor, no signal is transmitted to operate the table shifting mechanism. If the sheet is positioned away from the sensor, then the sensor will operate an external circuit to energize the means for shifting the table. Shifting motion will continue until the sheet has been positioned to cover the sensor at which point the shifting motion will cease. If desired, means may be provided to automatically return the table to its original position after the sheet has been removed from the table.

The sensor described above is used as a relay or simply to activate another circuit in a conventional and known manner. The table shifting mechanism is preferably a conventional motor, but other means for shifting the table may be provided if desired.

Referring now to the drawings, wherein preferred embodiments of the invention are depicted, and wherein like numerals refer to like parts:

FIG. 3 is a detail of a section of FIG. 2, showing switch means for initiating tilting motion of the table.

FIG. 4 is another detail of a section of FIG. 2 showing means for controlling and implementing the stacking of the sheet material.

FIG. 10 is a plan view of FIG. 8 adapted to carry a plurality of sheet materials.

Figure 1:
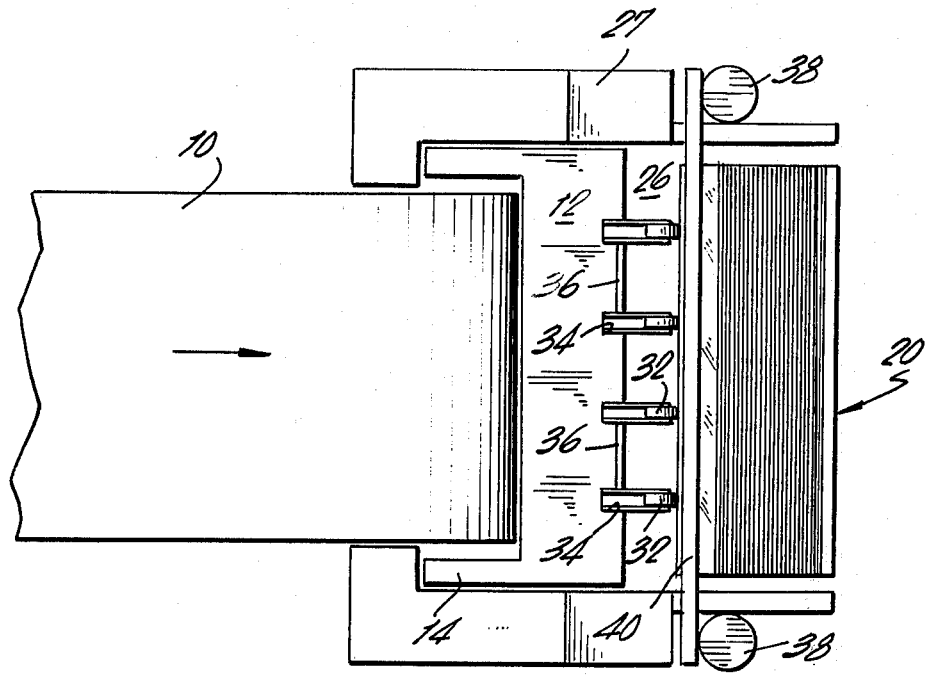
FIG. 1 is a top plan view of the sheet material stacking apparatus in accordance with the present invention.

Referring now to the drawings, numeral 10 denotes a conventional conveyor belt for carrying sheet material from one station to another. A tiltable table assembly 12 is provided at one end of the conveyor 10, the table assembly having a pair of extendable rails 14 which parallel the sides of the conveyor so that the supporting area of the tiltable table assembly 12 can be effectively increased. Tiltable table assembly 12 is mounted on a rotatable shaft 16 driven by conventional means (not shown) such as an electric motor. If desired, switch means 18 may be provided to control movement of the electric motor and thereby the shaft 16, or movement of the tiltable table assembly may be controlled by other means as described hereinbelow.

As sheet material is moved onto the tiltable table assembly 12, switch 51 (FIG. 3) energizes air cylinder 11 to rotate tiltable table assembly 12. As the tiltable table assembly moves toward the vertical position, the sheet material is transferred off the tiltable table assembly and onto the bed 21 of the receiving means in a vertical position.

Figure 2:
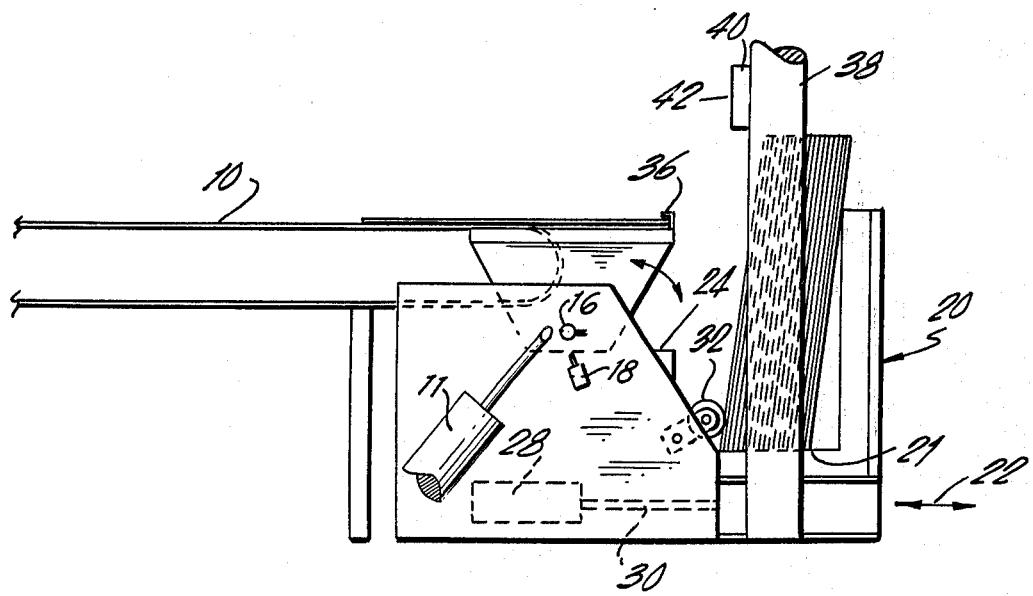
FIG. 2 is a side view of the apparatus of FIG. 1.

To provide for the stacking of more than one sheet of material, the sheet material receiving means is made movable in the horizontal direction as indicated by arrow 22 in FIG. 2. Movement of the sheet material receiving means is automatically controlled by a plurality of switches 25 (FIG. 4) contained in the bottom of frame member 26 which surround the sides and front of the tiltable table assembly 12. Mounted under tiltable table 12 and at the bottom of frame member 26 is a pressure cylinder assembly 28 of conventional construction for controlling the movement of the sheet material receiving means 20.

More specifically, as the sheet material is moved to the vertical position by the tilting table 12, the edge of the sheet material is caused to contact pad 33 causing pad arm 35 to move downwardly to operate the switch means 25. Switch means 25, in turn, operates a conventional air cylinder 23. Cylinder 23 has a piston therein (not shown) to which pad arm 35 is pivotally connected (not shown). This cylinder cycles pad 33 back out of the way of the sheet material. A spring 54 pulls the pad arm 35 up when the pad arm is free from under the sheet material. Switch means 25 is released and cylinder 23 returns forward, pushing sheet material receiving means 21 back the length of cylinder 23's stroke. This length is a distance such that the sheet material is one thickness away from roller 32. Conventional cylinder assembly 28 maintains a constant forward pressure on receiving means 21, and is used to return the receiving means to start position.

Figure 8:
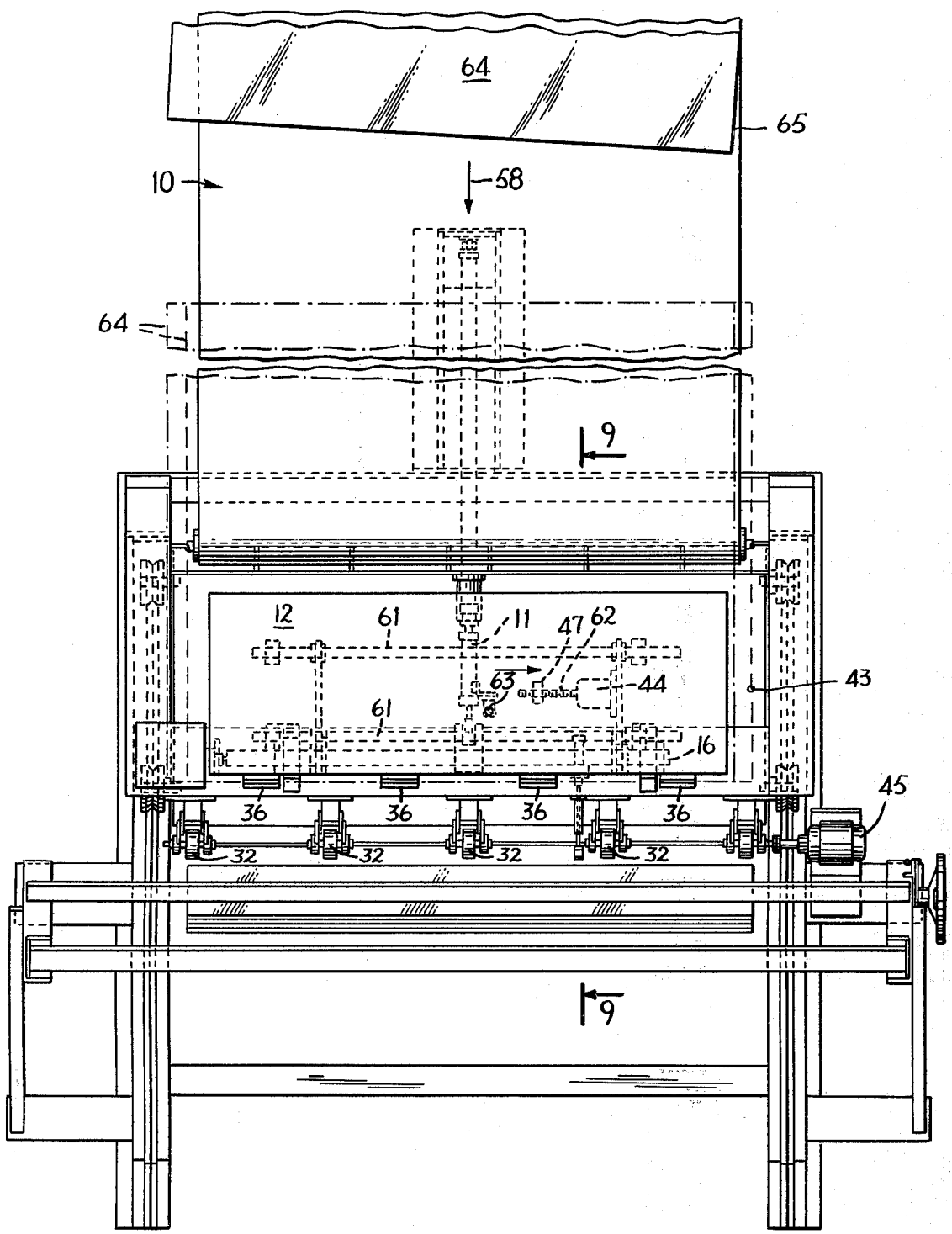
FIG. 8 is a plan view showing another operating mode of the apparatus shown in FIG. 1.

For properly handling the sheet material as it is being tilted and for stacking the sheet material on the sheet material receiving means with a minimum of free air space between sheets, a plurality of rolls 32, mounted on frame member 26, is provided. The rolls 32 may be freely rotatable or mounted on a common shaft for synchronized rotation. The common shaft may be driven by either hydraulic means or electric means 45 (FIG. 8). Rotation is initiated when the tilting table has tilted sufficiently to contact a switch (not shown) to complete the circuit to the drive unit, rotation continuing until the switch is released by the return motion of the tiltable table 12. As tiltable table assembly 12 moves toward the vertical position, the sheet material's lower edge moves onto the rolls and the sheet material is lifted out of holding lip 36, thereby being free to move from the rolls onto the receiving means. To properly implement this, tiltable table assembly 12 is provided with a plurality of indentations or slots 34 to permit rolls 32 to pass through the table assembly. For best results, a holding lip 36 is provided over at least a portion of the front of the tiltable table assembly to retain the sheet material in position on the table until contact is made with the rolls. Holding lip 36 is provided with a stop and a return (both unnumbered), the return being spaced from the surface of the table. The edge of the sheet is slid into the space between the surface of the table and the return until it abuts the stop. when the table is tilted, the return prevents the sheet from flipping backwardly off the table, thereby permitting the table to carry sheets which are longer than the table. It can be readily appreciated that if contact is made with the forward portion of the rolls 32, as the table is further tilted, the leading edge of the sheet material will be moved towards the center portion of the rolls by the rotation of the rolls. This movement will cause the sheet material to be moved somewhat vertically downward as it follows the contour of the rolls and thereby lifted out of the restraint imposed by the lip 36. Synchronized rotation of all rolls driven as shown in FIG. 8 tends to positively move the sheet material over lip 36 without depending on the weight of the sheet to cause roll rotation.

To provide for a minimum amount of shock, a pair of uprights or posts 38 is provided on either side of the sheet material receiving means 20. Movably mounted on these uprights is a cushioning bar 40. Cushioning bar 40 is movably mounted on the uprights 38 by conventional means (not shown) such as a simple telescoping track or tube to permit vertical positioning of the cushioning bar in any position desired. The cushioning bar is set at a height level coincident with the uppermost portion of the sheet material to be stacked. The cushioning bar is provided with a conventional cushioning material 42 such as felt, or other soft substance which, as the sheet material nears vertical, acts as an abutment surface against uncontrolled rotating motion of the sheet material. Without the presence of this cushioning bar, the sheet material may continue to pivot into the sheet material previously stacked with consequent damage.

Figure 5:
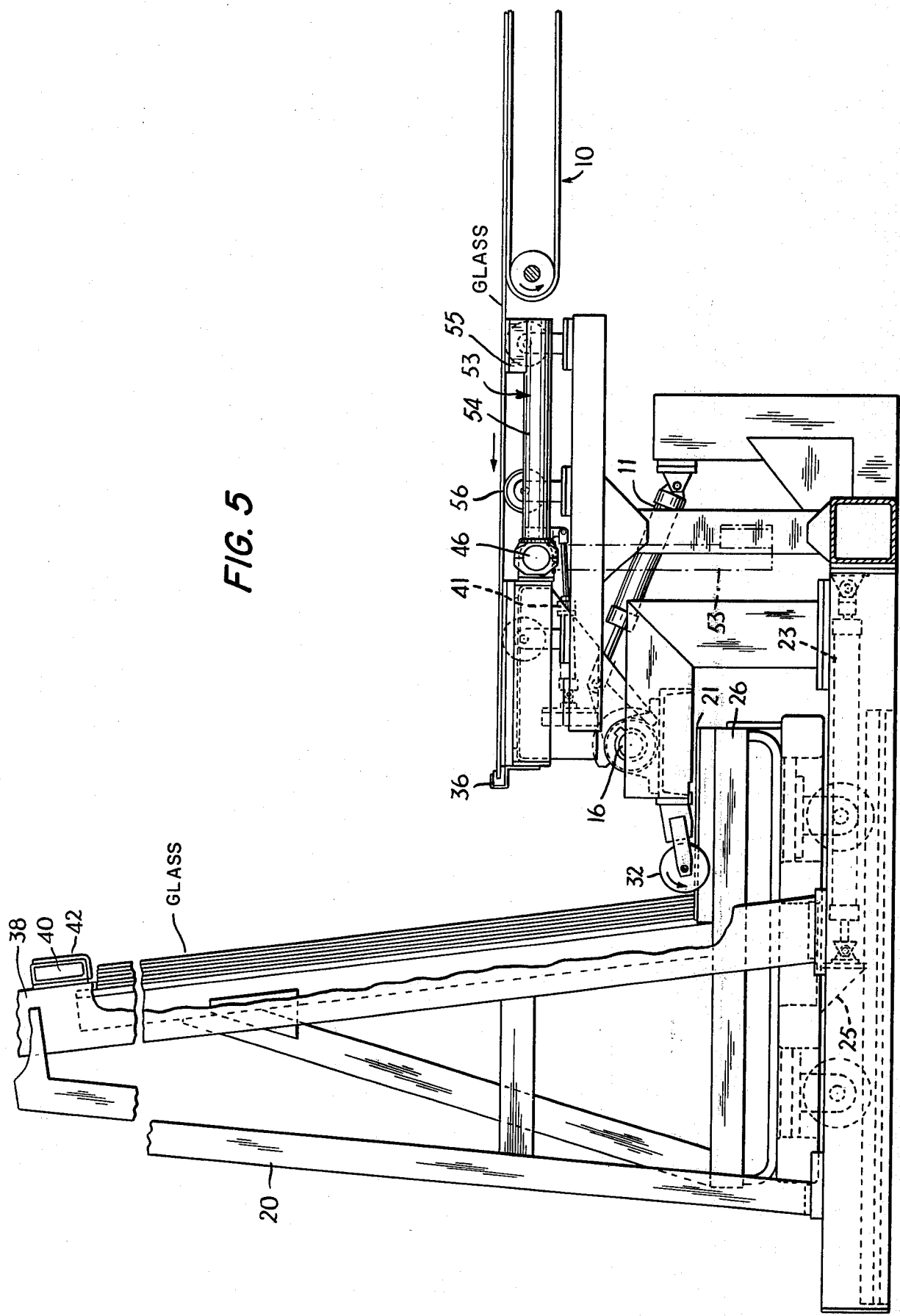
FIG. 5 is a side view of another embodiment of the apparatus shown in FIGS. 1 and 2.
Figure 6:
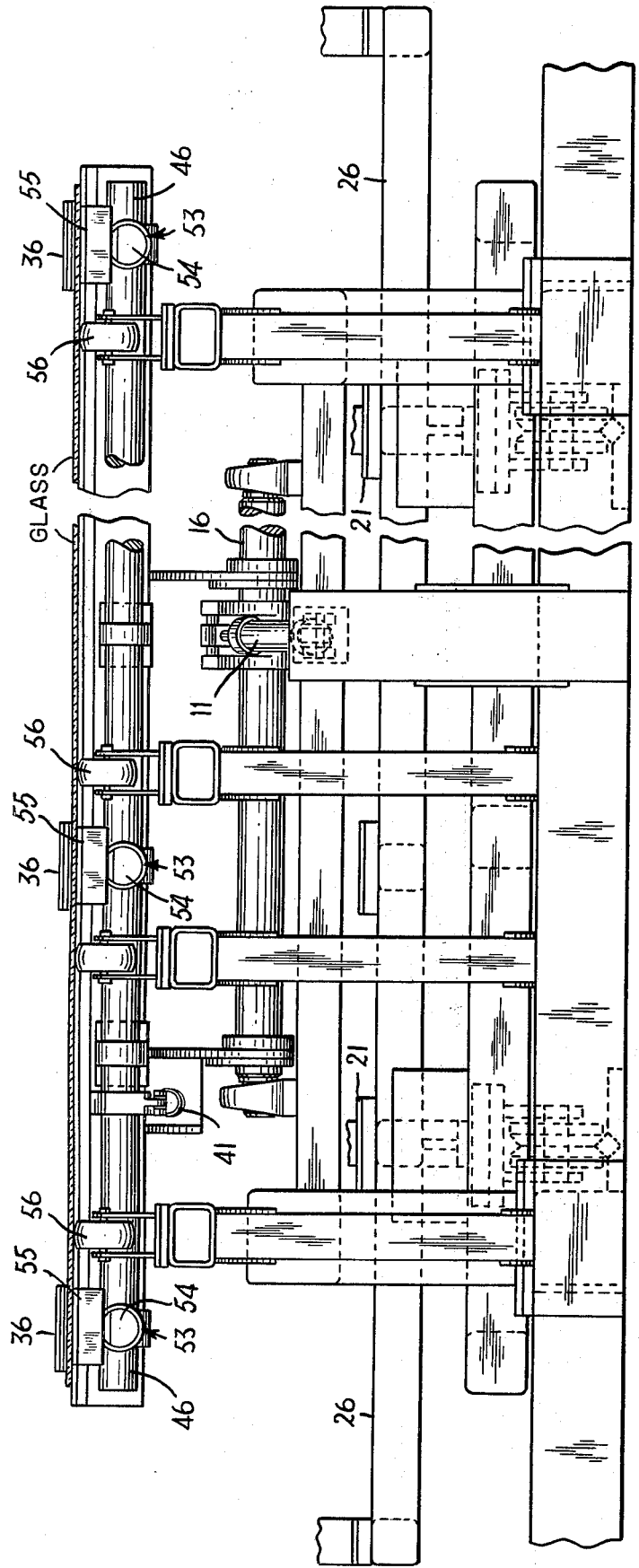
FIG. 6 is a front view of the apparatus shown in FIG. 5.
Figure 7:
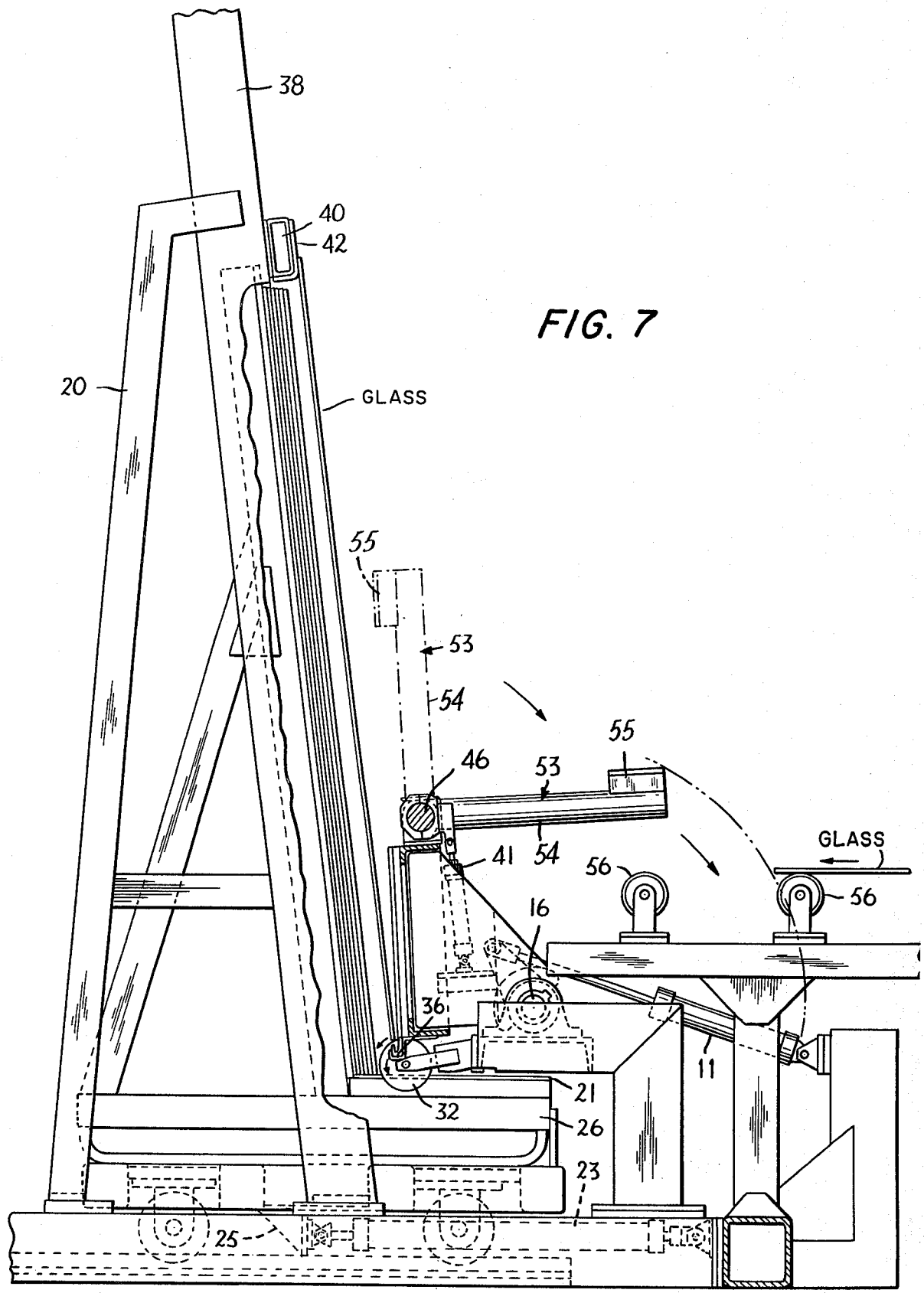
FIG. 7 is a side view showing another operating position of the apparatus shown in FIG. 5.

Another embodiment of the apparatus shown in FIGS. 1 and 2 is shown in FIGS. 5 through 7. Movable extension members or arms 53, capable of permitting the free movement of the sheet material to the accumulator as well as providing means for handling sheet material, extend lengthwise beyond the supporting surface area of tiltable table assembly 12. The extension members 53 pivot around the tiltable table assembly in a fixed angle and may be driven by either electric or preferably the hydraulic means 41 shown. Since the extension member is pivoted around shaft 46 of the tiltable table assembly, it will also follow the rotation of the supporting surface of the table assembly. The operation of the extension members is shown in FIGS. 5 and 7. In order that the sheet material is able to move from the conveyor belt 10 to the tiltable table assembly without interference, it is preferred that the extension members be in a position below that of the sheet material, such as shown in outline in FIG. 5.

Extensible arms 53 have a front portion or pads 55 adapted to contact the sheet material. The rear portion 54 is simply an arm and can be any length depending on the length of sheet material it is desired to have the material handling system cope with. Although not shown, it is possible to make the arms 53 telescoping to increase or decrease their length to permit the system to handle additional sheet lengths.

In a situation in which the arms 53 are to be fixed, the minimum length to be used is chosen equal to the length of sheet which will break (if glass) or bend unduly due to excessive overhang. This length can be chosen using any breakage or bending factor desired, i.e. if 5% of the glass breaks, then extension arms 53 are to be used. For best results, the arm length should be set to that length needed to support sheet lengths which bend or break on a regular, although small, percentage basis. Generally, for glass, the length of arm is chosen to support glass sheet having a length twice that of the table regardless of glass thickness.

To avoid interference between pads 55 and the sheet material, the leading edge of the sheet material should clear the pads before the pads are brought into contact with the sheet. As shown in FIG. 5, a conventionally driven roll or series of rolls (one only shown) 56 is positioned forward of the pads 55 to engage the sheet to help pull the sheet over the pad and onto the table. Preferably, the sheet will be permitted to engage rolls 56 before the pads 55 contact the sheet to avoid having the pads interfere with sheet movement. Of course, the sheet may be permitted to move to the lip 36 of the table before the pads 55 are brought into contact with the sheet if desired.

FIGS. 5, 6 and 7 detail the operation of extension members 53. After the sheet material is in position for rotation, but prior to actuation of the tilting means, such as air cylinder 11, hydraulic means 41 is actuated to rapidly place the extension members 53 into the supporting position as shown in FIGS. 5, 6 and 7. Actuation of the tilting means rotates both the surface of the table assembly and the extension members supporting the sheet material from the horizontal to the vertical position. After the sheet material has been deposited onto bed 21, the extension members 53 are retracted by hydraulic means 41 to its initial position prior to the entry of a subsequent sheet of material. Preferably, extension members 53 are retracted prior to the return of the table 12 to horizontal to shorten the arc prescribed by the extension member in its return to the position shown in FIG. 5 (dotted lines). This permits closer spacing of adjacent oncoming sheets to increase the number of sheets which can be handled by the system during a given period of time.

Figure 9:
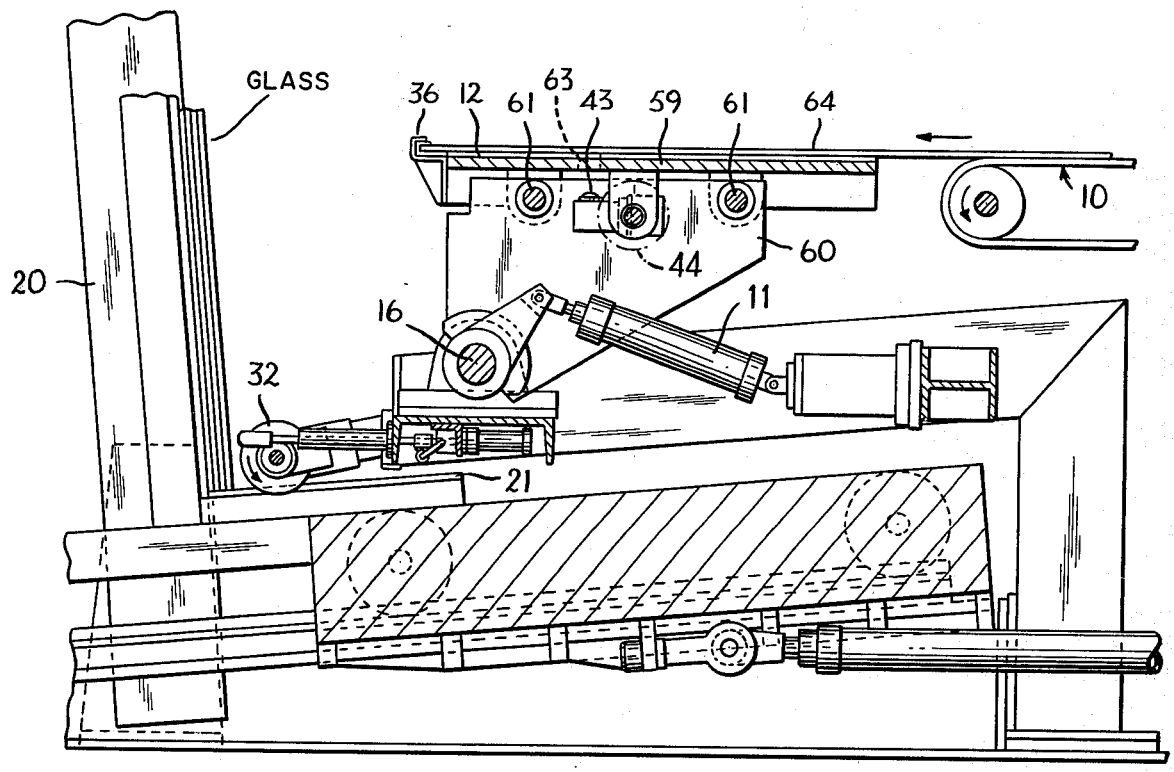
FIG. 9 is a side view of the apparatus of FIG. 8.

Another embodiment of the apparatus of FIGS. 1 and 2 is shown in FIGS. 8 and 9. This embodiment incorporates means for shifting the supporting surface area of the tiltable table assembly to correctly position sheet material received from the conveyor belt in a misaligned or skewed position with respect to the direction or movement of the sheet. In FIG. 8, sheet material is shown entering the tiltable table assembly skewed with respect to the line of movement 58 of the sheet. A sensor 43, positioned on one side of the sheet, is activated by switch 51 when it is contacted by the sheet. The sensor may be any conventional sensor such as a photoelectric cell or a pressure sensitive switch conventionally connected to the circuit for energizing motor 44. Motor 44 may be any conventional motor connected to a standard AC source, the sensor being conventionally connected into the circuit delivering power to the motor to control motor actuation.

The table 12 in this embodiment has two sections 59 and 60 which are slidably connected together through a common shaft 61 so that section 59 can move relative to section 60. Motor 44 is mounted on section 60 and is of the rotating type having a screw 62 mounted thereon. Screw 62 is in turn connected to table section 59 via threaded block 47. Rotational motion of screw 61 will move table section 59 relative to table section 60.

Sensor 43 is located along the side of the table as shown in FIGS. 8 and 10. As shown, the sensor is located such that the sensor centerline and edge of the sheet will coincide when the sheet material is correctly positioned on the table section 59.

The sensor 43, switch 51 and motor 44 are on a single conventional circuit. Both switch 51 and sensor 43 must be out of the motor circuit in order to activate motor 44. As shown in FIG. 8, sheet 64 is askew with respect to arrow on line 58 such that the edge 65 of the sheet will not contact sensor 43. When the sheet contacts lip 36, it will straighten out, as shown, but the edge 65 will not be in line with sensor 43. When switch 51 is activated by the sheet, it will activate motor 44 unless sensor 43 is covered by the sheet. When motor 44 is activated, the entire table section 59 will shift to the right as viewed in FIG. 8 until the edge 65 of sheet 64 covers sensor 43, at which time shifting motion will cease. After the sheet has been removed from the table and deposited in the receiving means, the motor 44 will automatically reverse itself and return the table section 59 to its prior position. The circuitry for achieving this is well known and simply consists of a relay and a switch in the motor circuit for deactivating the motor when the motor or table has returned to the selected position.

FIG. 10 shows a two table arrangement similar to FIG. 8 except that two individual tables each capable of independent shifting motion as shown in the drawing.

While only a limited number of embodiments of the foregoing invention have been expressly described, it is nonetheless to be broadly construed and not to be limited except by the character of the claims appended hereto. Although the foregoing has been drawn to sheet material, it is to be understood that this apparatus is especially adapted for the handling of brittle and easily fractured materials such as glass.

What is claimed is:

1. A sheet material accumulator comprising: a tiltable table movable from horizontal position towards vertical and on which the sheet material is normally carried in a horizontal position, said tiltable table having a lip thereon for retaining sheet material on said table during tilting thereof, said lip comprising a stop located at the end of the table and a return on said stop, said return being spaced from the table a distance sufficient to permit the edge of the sheet to slide between the table and return, means for tilting said table to move said sheet material towards vertical position; means for removing said sheet material from said table after said table has moved a selected distance toward vertical position; means for receiving said sheet material and means for reducing contact shock when said sheet material is placed on said receiving means.

2. The accumulator according to claim 1 wherein said roll is driven, and means for driving said roll to forceably lift said sheet material over said lip.

3. The accumulator according to claim 1 wherein said receiving means further comprises a horizontally moveable bed.

4. An accumulator according to claim 3 further comprising switch means for controlling the horizontal movement of said bed, said switch means being actuated by being contacted by said sheet material as the sheet material nears the vertical position, and means for first moving said bed in a direction away from said table when said switch is actuated to receive said sheet material and then back toward said table a predetermined distance less than the distance moved away from said table.

5. An accumulator according to claim 4 further comprising pressure means for coacting with said bed as it moves back toward said table, said pressure means terminating movement of said bed after a predetermined pressure has built up therein.

6. An accumulator as claimed in claim 1 further comprising extensible arms mounted on one end of said table, said extensible arms being moveable from a first retracted position in which the extensible arms are located under the said tiltable table when said table is in a horizontal position to a second position in which said extensible arms are substantially parallel to the surface of the said table to support sheet material on said table, and means for moving said extensible arms between said two positions.

7. An accumulator as claimed in claim 6 wherein each extensible arm comprises an arm and a pad mounted thereon, said pad contacting said sheet material when positioned parallel to the surface of said table, and means for moving said pad into contact with said sheet material after the leading edge of said sheet material has moved past said pad.

8. An accumulator as claimed in claim 7 wherein said extensible arm is pivotably mounted on one end of said table, said extensible arm being pivotable from a vertical position below said table to a horizontal position parallel to the surface of said table, said arm and pad extending the table to permit the table to carry material sheets which normally extend beyond the table.

9. An accumulator as claimed in claim 7 wherein said extensible arm remains parallel to the surface of said table during tilting movement of the table towards vertical, and means for pivoting said extensible arm away from said parallel position before said table has been returned to horizontal position to permit placement of the next sheet material on said table without interference from said pad.

10. The accumulator according to claim 1 wherein said contact shock reducing means comprises means for restricting the pivoting motion of said material sheet as said sheet is placed on said means for receiving said sheet material.

11. The accumulator according to claim 10 wherein said contact shock reducing means further comprises a bar adjacent the extreme edge of the free end of the pivoting sheet material, said bar having cushioning means thereon for absorbing the kinetic energy of said free end as the sheet material is pivoted from said tiltable table.

12. The accumulator according to claim 1 wherein said means for removing said sheet material from said table comprises a plurality of indentations in said lip and a plurality of rolls positioned below said tiltable table, said rolls being adapted to pass through said indentations as said table is moved to said vertical position to lift said sheet material out of said lip and onto said receiving means.

13. The accumulator according to claim 12 wherein said indentations extend into said table for a selected distance.

14. A sheet material accumulator as claimed in claim 1 further comprising means for depositing a sheet of material in a selected lateral position on said receiving means comprising sensing means for detecting lateral misalignment of said sheet material on said table, means for laterally shifting said table activatable by said sensing means, said table being movable from a position in which said sheet material is misaligned with respect to said receiving means to a position in which said sheet is aligned with respect to said receiving means.

15. The accumulator according to claim 14 wherein said sensing means comprise a plurality of optical sensors mounted below said table, and an opening in said table positioned above said optical sensors to permit said sensors to sense the absence or presence of a sheet of material above said opening.

16. The accumulator according to claim 14 wherein said table has a sheet material supporting surface and a lower surface, said sheet material supporting surface being mounted for lateral movement on said lower surface.

17. A sheet material accumulator as claimed in claim 16, wherein said shifting means further comprises a motor having a screw thereon, said motor being mounted on the lower surface, and said screw being in complementary threads rotationally mounted on said supporting surface, whereby rotation of said screw will laterally shift said supporting surface.

18. The accumulator according to claim 14 wherein said means for laterally shifting said table returns said table to a first preselected position after each sheet of material is moved onto said receiving means.

19. The accumulator claimed in claim 14, wherein said shifting motion is initiated only when said sheet material does not cover said sensor, said motion continuing until said sensor has been covered by said sheet material.

20. The accumulator claimed in claim 14 further comprising switch means in said table, said sensor being unable to activate said shifting means until said switch means has been activated by said sheet material.

21. A sheet material accumulator comprising: a tiltable table movable from a horizontal position towards vertical and on which the sheet material is normally carried in a horizontal position; a lip on said table for retaining said sheet material during movement of said table towards vertical position, said lip comprising a stop located at the end of the table and a return on said stop, said return being spaced from the table a distance sufficient to permit the edge of the sheet to slide between the table and return, means for tilting said table to move said sheet material towards vertical position; means for lifting said sheet material over said lip and means for receiving said sheet material, said means having a horizontally movable bed to accommodate one or more units of the sheet material; switch means for controlling the horizontal movement of said bed; and means for reducing contact shock as the sheet material is placed on said receiving means.

22. An accumulator according to claim 21 wherein said lifting means comprises one or more rolls positioned below said table, said table having one or more slots therein to permit the rolls to pass through said table as the table is tilted towards vertical, said rolls being positioned under the said sheet material when the table is near vertical whereby said rolls will move the sheet material over said lip and onto said receiving means.

23. An accumulator according to claim 21 further comprising a pair of posts positioned on either side of said bed, a cushion bar mounted on said posts, said bar having cushioning material thereon whereby as said tilting table moves towards vertical position, said sheet material contacts said cushion bar to reduce the force at which said sheet material would otherwise move onto said receiving means.

24. A sheet material accumulator comprising a tiltable table movable from a horizontal position towards vertical and on which said sheet material is normally carried in a horizontal position, said table having a sheet material holding lip thereon, said lip comprising a stop located at the end of the table and a return on said stop, said return being spaced from the table a distance sufficient to permit the edge of the sheet to slide between the table and return, means for receiving said sheet material positioned below said table and being movable to accept more than one unit of sheet material thereon, switch means mounted for operation as said table is tilted to initiate movement of said receiving means, a cushioning bar positioned in front of said table to halt forward movement of said sheet material as the sheet material is being tilted to permit said sheet material to be gently positioned on said receiving means, rolls positioned below said table, said table further having slots therein to permit the rolls to pass through said table as the table is tilted to the vertical, said rolls being positioned under the said sheet material when the table is near vertical whereby said rolls will move the sheet material over said lip and onto said receiving means as said table is moved further towards vertical position.

25. A sheet material accumulator comprising a plurality of side-by-side receiving means for receiving sheets of material, a plurality of side-by-side tiltable tables equal in number to said receiving means and tiltable in unison, each said table having a lip on one end thereof for retaining said sheets on said table during tilting movement; means for feeding sheet material onto said tables and means for lifting said sheet over said lip when said table has moved to a selected vertical position, each of said receiving means having a horizontally movable bed to accommodate one or more units of said sheet material, switching means for controlling the horizontal movement of each said bed, means for reducing contact shock on each said receiving means, and means for laterally shifting each said table assembly independently of the other said tables to realign a sheet of material on said table which is askew to a selected position, sensing means for sensing the misalignment of said sheet material and for activating said means for laterally shifting the said table assembly to compensate for said misalignment so that each sheet placed on a receiving means is in substantial alignment with other sheets previously placed on said receiving means, said means for laterally shifting said table returning said table to its original position after said sheet has been deposited on said receiving means.

26. A sheet material accumulator comprising a tiltable table movable from horizontal position towards vertical and on which the sheet material is normally carried in a horizontal position, lip means on said table for retaining said sheet material on said table during tilting motion thereof, said lip comprising a stop located at the end of the table and a return on said stop, said return being spaced from the table a distance sufficient to permit the edge of the sheet to slide between the table and return, means for tilting said table to move said sheet material towards a vertical position, means for moving said sheet material over said lip after said table has moved to said vertical position; means for receiving said sheet material positioned in front of said table and having a horizontally movable bed to accommodate a plurality of sheets thereon, and switch means for controlling the horizontal movement of said bed, said switch means being actuated when contacted by said sheet material during the time said sheet material is being deposited on said bed; and means for moving said bed in a direction away from said table when said switch is actuated to receive said sheet material.

* * * * *